United States Patent
French et al.

(10) Patent No.: US 7,085,826 B2
(45) Date of Patent: *Aug. 1, 2006

(54) METHOD AND SYSTEM FOR DYNAMIC ADDITION AND REMOVAL OF MULTIPLE NETWORK NAMES ON A SINGLE SERVER

(75) Inventors: Steven Michael French, Austin, TX (US); Steven Lawrence Dobbelstein, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 505 days.

This patent is subject to a terminal disclaimer.

(21) Appl. No.: 10/254,308

(22) Filed: Sep. 25, 2002

(65) Prior Publication Data

US 2003/0051010 A1    Mar. 13, 2003

Related U.S. Application Data

(62) Division of application No. 09/282,614, filed on Mar. 31, 1999, now Pat. No. 6,745,241.

(51) Int. Cl.
*G06F 15/177* (2006.01)

(52) U.S. Cl. .............................. 709/221; 714/4; 714/7; 714/13

(58) Field of Classification Search ................ 709/203, 709/220, 221, 227, 239, 223, 238; 713/100; 714/4, 13, 5, 15; 718/101
See application file for complete search history.

(56) References Cited

U.S. PATENT DOCUMENTS

| 5,852,724 | A | * | 12/1998 | Glenn et al. ................ 709/239 |
| 5,878,212 | A | * | 3/1999 | Civanlar et al. ............ 709/203 |
| 5,938,732 | A | | 8/1999 | Lim et al. ................... 709/229 |
| 5,999,712 | A | * | 12/1999 | Moiin et al. ................ 709/220 |
| 6,134,673 | A | | 10/2000 | Chrabaszcz .................. 714/13 |
| 6,145,089 | A | * | 11/2000 | Le et al. ........................ 714/4 |
| 6,192,401 | B1 | * | 2/2001 | Modiri et al. ............... 709/220 |
| 6,219,799 | B1 | | 4/2001 | Kandasamy .................... 714/4 |
| 6,243,825 | B1 | * | 6/2001 | Gamache et al. .............. 714/4 |
| 6,442,685 | B1 | | 8/2002 | French et al. ............... 713/100 |
| 6,490,610 | B1 | * | 12/2002 | Rizvi et al. ................. 718/101 |
| 6,691,165 | B1 | * | 2/2004 | Bruck et al. ................ 709/227 |
| 6,868,442 | B1 | * | 3/2005 | Burdeau ..................... 709/223 |
| 6,968,390 | B1 | * | 11/2005 | Chavez, Jr. ................ 709/238 |
| 2003/0163755 | A1 | * | 8/2003 | Fung et al. .................... 714/4 |

* cited by examiner

*Primary Examiner*—John Follansbee
*Assistant Examiner*—Dustin Nguyen
(74) *Attorney, Agent, or Firm*—Duke W. Yee; Jeffrey S. LaBaw; Betty Formby

(57) ABSTRACT

A method and apparatus for configuring a server in a distributed data processing system is provided. The server receives a request for a function that specifies a first server name and a second server name. The server responds to requests directed to a set of server names that includes the first server name. The function executes on the server specified by the first server name, wherein the function dynamically modifies a membership of the second server name in the set of server names. The server names for the server are added or removed dynamically without halting or restarting the server.

14 Claims, 16 Drawing Sheets

METHOD AND SYSTEM FOR DYNAMIC ADDITION AND REMOVAL OF MULTIPLE NETWORK NAMES ON A SINGLE SERVER

This application is a divisional of application Ser. No. 09/282,614, filed Mar. 31, 1999, now U.S. Pat. No. 6,745,241.

CROSS-REFERENCE TO RELATED APPLICATIONS

The present application is related to application Ser. No. 09/282,677, now U.S. Pat. No. 6,442,685 filed Mar. 31, 1999, titled "Method and System for Multiple Network Names of a Single Server," hereby incorporated by reference, and application Ser. No. 09/292,190, now U.S. Pat. No. 6,368,330, filed Mar. 31, 1999, titled "Method and System for Enabling a Network Function in the Context of One or All Server Names in a Multiple Server Name Environment," hereby incorporated by reference.

BACKGROUND OF THE INVENTION

1. Technical Field

The present invention relates generally to an improved data processing system and, in particular, to a method and system for using server names in a distributed data processing environment.

2. Description of Related Art

As electronic commerce becomes more prevalent, business relationships between vendors and between a vendor and its customers becomes more valuable. Businesses are more willing to protect those relationships by spending more money on information technology that protects the integrity of their electronic commerce connections. In so doing, businesses protect not only their data and cash flow but also intangibles such as reputations and goodwill. In addition, the complexity of information technology, the pressure of global competition, and the demands of universal access and round-the-clock availability of electronic systems greatly increases the need to minimize disruptions in electronic commerce operations.

A corporation's information technology infrastructure may fail at various pressure points, such as telecommunication links, software application errors, and computer hardware failures. The complexity of distributed data processing systems places greater reliability demands on all of these factors. One method of increasing the reliability of a system is building redundancy into a system.

When a server fails in a network that contains more than one server, another server can assume the responsibilities of the failed server. In order for a recovery server to assume the role of a failed server, the recovery server needs to be able to respond to requests to the failed server on the network.

Typically, a cluster of servers are configured to respond to a shared cluster name, and each of the servers in the cluster assumes a portion of the duties related to the total demand placed on the cluster by clients. If a server fails, the set of servers in the cluster was already configured to share the processing duties among the other servers in the set, and the failure of a single server merely places a slightly larger processing load on the remaining servers in the cluster.

However, configuring a cluster for fail-over can be rather cumbersome. In one method, in order to set up a cluster of servers that can fail over to each other, all of the existing server names must be assembled and placed into a fail-over group of names. The individual servers are then given other new names.

In addition to fail-over, there are other scenarios for networked servers in which a server is either brought on-line or taken off-line in an effort to improve the reliability of the system. The addition of new hardware, the maintenance of previously installed hardware, and the migration of servers are merely a few examples.

Usually a server is brought off-line to be reconfigured during these various scenarios. Clients that rely on a server taken off-line are inconvenienced while the server is off-line, which creates indirect costs associated with the problem originally being resolved during the reconfiguration.

It would be advantageous to have a method and apparatus for configuring servers so that a server may easily assume the responsibilities of another server in a fail-over situation. It would be particularly advantageous if the same method and apparatus may be used to facilitate the migration and maintenance of servers in such a way that the clients on a network experience a minimum of inconvenience during a reconfiguration of a server.

SUMMARY OF THE INVENTION

The present invention provides a method and apparatus for configuring a server in a distributed data processing system. The server receives a request for a function that specifies a first server name and a second server name. The server responds to requests directed to a set of server names that includes the first server name. The function executes on the server specified by the first server name, wherein the function dynamically modifies a membership of the second server name in the set of server names. The server names for the server are added or removed dynamically without halting or restarting the server.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
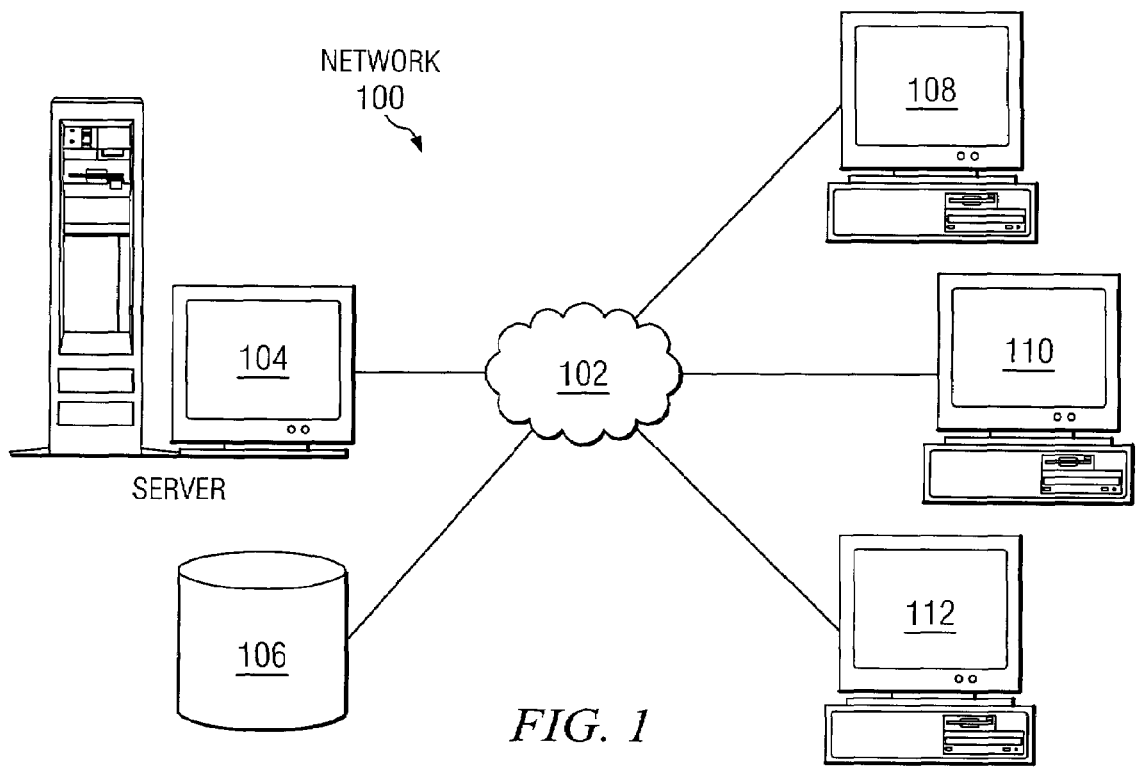
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
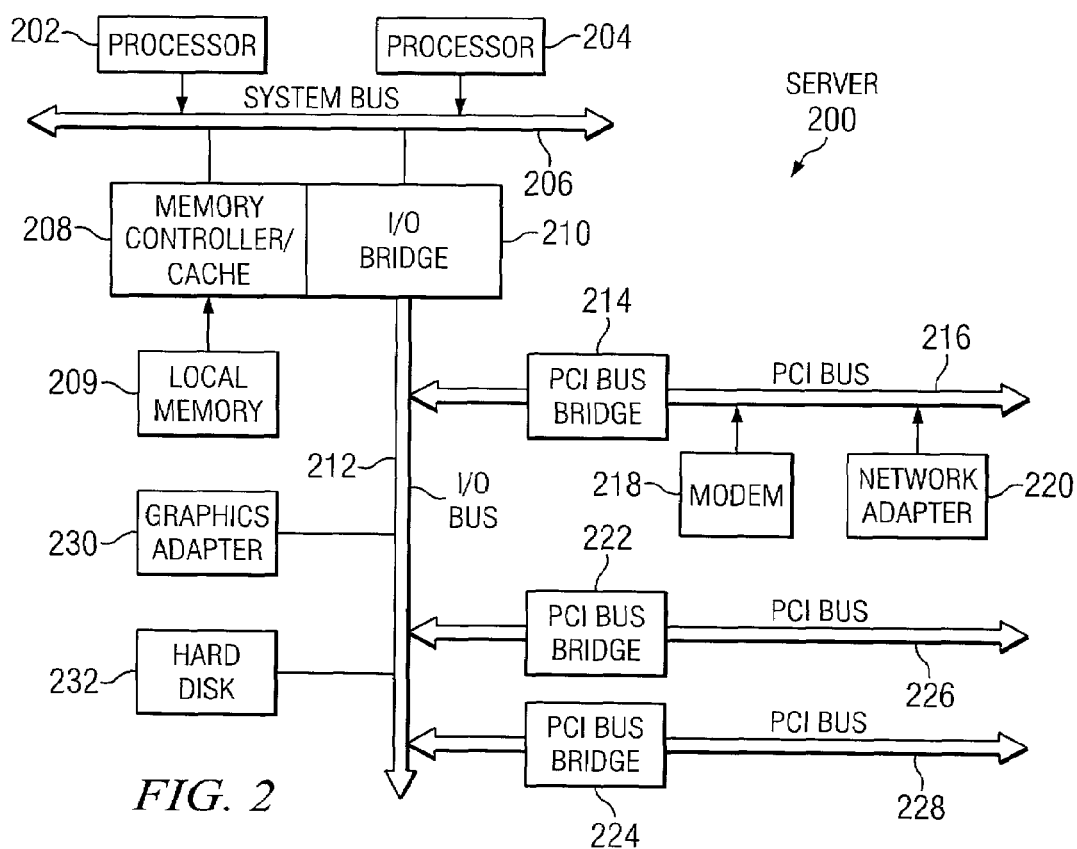
FIG. 2 is a block diagram depicting a data processing system, which may be implemented as a server.

Referring to FIG. 2, a block diagram depicts a data processing system, which may be implemented as a server, such as server 104 in FIG. 1, in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
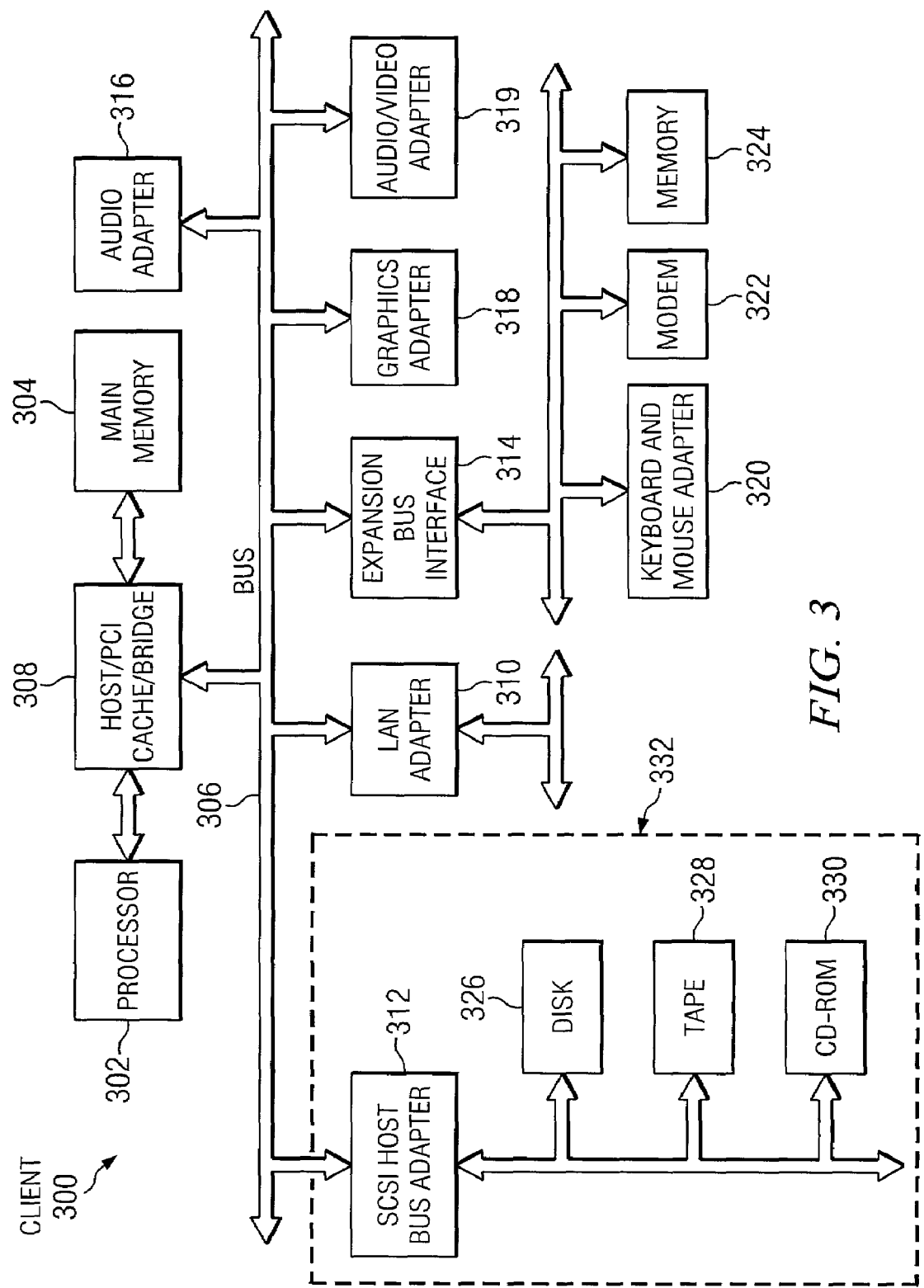
FIG. 3 is a block diagram illustrating a data processing system in which the present invention may be implemented.

With reference now to FIG. 3, a block diagram illustrates a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data.

The depicted example in FIG. 3 and above-described examples are not meant to imply architectural limitations.

Figure 4:
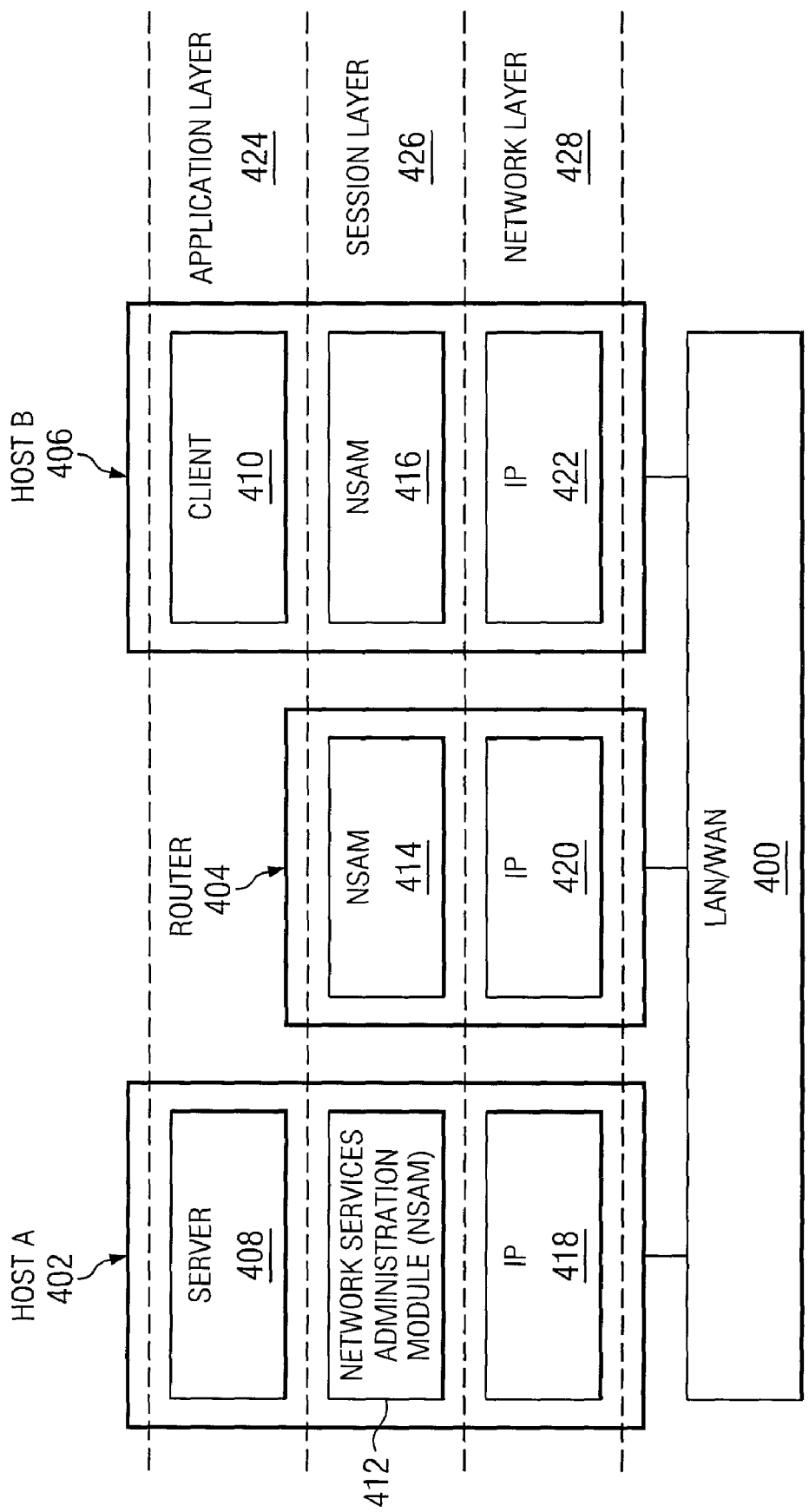
FIG. 4 is a block diagram depicting a simplified network architecture that shows software components that may communicate with each other across the depicted network.

With reference now to FIG. 4, a block diagram depicts a simplified network architecture that shows software components that may communicate with each other across the depicted network. LAN/WAN 400 connects host computer 402 named "Host A" and host computer 406 named "Host B". Router 404, also connected to the network, routes data packets across the LAN between the depicted computers and other networks that may be connected to the LAN that are not shown in FIG. 4. Host computer 402 may be similar to server 104 in FIG. 1, and host computer 406 may be similar to clients 108–112 in FIG. 1.

Three separate communication layers are shown in FIG. 4: application layer 424, session layer 426, and network layer 428. The software components within these layers may use a variety of protocols to communicate with each other. Network layer 428 contains IP 418 on host computer 402, IP 420 on router 404, and IP 422 on host computer 406. These components provide low-level network communication using IP or Internet Protocol. Alternatively, other network protocols may be used on LAN/WAN 400 without affecting the execution of the higher-level layers of software.

Session layer 426 contains network services administration module (NSAM) 412 on host computer 402, NSAM 414 optionally implementable on router 404, and NSAM 416 on host computer 406. The NSAM provides standard network communication services to applications, utilities, and drivers on various computer systems. NSAMs 412–416 may be similar to each other.

Application layer 424 contains server 408 and client 410 on host computers 402 and 406, respectively. Each of these applications provides some type of end-user processing or other high-level computer services. Within the example of FIG. 4, server 408 and client 410 are shown as applications residing on different host computers. Each host computer may support multiple clients and servers, and server 408 and client 410 could reside on the same host computer. However, server 408 may be providing some type of data in return to requests from client 410, and in this type of computing environment, host computer 402 may be generally termed a "server" and host computer 406 may be generally termed a "client."

NSAMs 412–416 provide a generic depiction of software components within session layer 426. The NSAM may be provided by a variety of standard network applications, such as NetBIOS and TCP. Other protocols may be layered on top of these, such as various types of RPCs (Remote Procedure Call).

NetBIOS (Network Basic Input/Output System) is an operating system interface that allows applications on different computers to communicate within a local area network. NetBIOS may also be viewed as a session layer communications service used by client and server applications in a distributed data processing system. NetBIOS was created by IBM for its early PC networks and has become a de facto industry standard. NetBIOS may generate Ethernet, Token Ring, and FDDI as well as other MAC (media access control) level protocols. NetBIOS has been implemented for many operating systems including Microsoft Windows NT, IBM OS/2, DOS, etc. NetBIOS does not, in itself, support a routing mechanism, and applications communicating on a WAN must use another "transport mechanism", such as TCP, rather than, or in addition, to NetBIOS.

NetBIOS provides application programming interfaces (APIs) that free an application or driver from containing code that understands the details of the network, including error recovery in session mode. A NetBIOS request is provided in the form of a Network Control Block (NCB) which, among other things, specifies a message location and the name of a destination. NetBIOS provides the session and transport services described in the Open Systems Interconnection (OSI) model. However, it does not provide a standard frame or data format for transmission. The standard frame format is provided in the NetBIOS Extended User Interface (NetBEUI).

NetBIOS provides two communication modes: session or datagram. Session mode lets two computers establish a connection for a "conversation", allows larger messages to be handled, and provides error detection and recovery. Datagram mode is "connectionless", i.e. each message is sent independently. In datagram mode, messages must be smaller, and the application is responsible for error detection and recovery. Datagram mode also supports the broadcast of a message to every computer on the LAN.

NetBIOS provides applications with a programming interface for sharing services and information across a variety of lowered-layer network protocols including IP, IPX, and NetBEUI. There are three categories of NetBIOS services: the name service, the session service, and the datagram service. The NetBIOS name service allows an application to verify that its own NetBIOS name is unique. The application issues an "add name" query to NetBIOS. NetBIOS broadcasts the "add name" query containing the name. NetBIOS applications that receive the query return an "add name" response or a "name-in-conflict" response. If no response to the query is received (typically after six broadcasts staggered in time), the name is considered to be unique. The NetBIOS name service also allows an application to delete a NetBIOS name that the application no longer requires, and it allows an application to use a server's NetBIOS name to determine the server's network address. The application issues a "name query" request to NetBIOS containing the target server's NetBIOS name, for which NetBIOS broadcasts the "name query" request. The server that recognizes the name returns a "name query" response containing its network address.

The NetBIOS session service allows an application to conduct a reliable, sequenced exchange of messages with another application. The messages can be up to 131,071 bytes long. The NetBIOS datagram service allows an application to exchange datagrams with a specific application or to broadcast datagrams to a group and receive datagrams from the group. Datagrams allow applications to communicate without establishing a session. When a NetBIOS application wants to send information that does not require acknowledgement from the destination application, the application can transmit a NetBIOS datagram.

TCP is another network protocol that provides reliable sequenced data transfer between local or remote hosts. TCP communicates program to program, not machine to machine. It works by opening up a stream or virtual circuit between the two ports, which begins by alerting the receiver to expect information and ends by an explicit termination signal. It guarantees that data reaches its destination and re-transmits any data that did not get through.

TCP is responsible for taking the desired information and breaking it into manageable chunks. TCP creates segments or user datagrams by taking the information from the application layer and adding a header to it. Each piece is numbered so a receipt can be verified and so the data can be put back into the proper order. If some pieces are missing, it asks the sender to send them again. Once it has all the information in the proper order, it passes the data to whatever application program is using its services. Since every segment received is answered with an acknowledge, TCP is a reliable stream delivery service-either the information is "guaranteed" to arrive, or an error will be returned.

Figure 5:
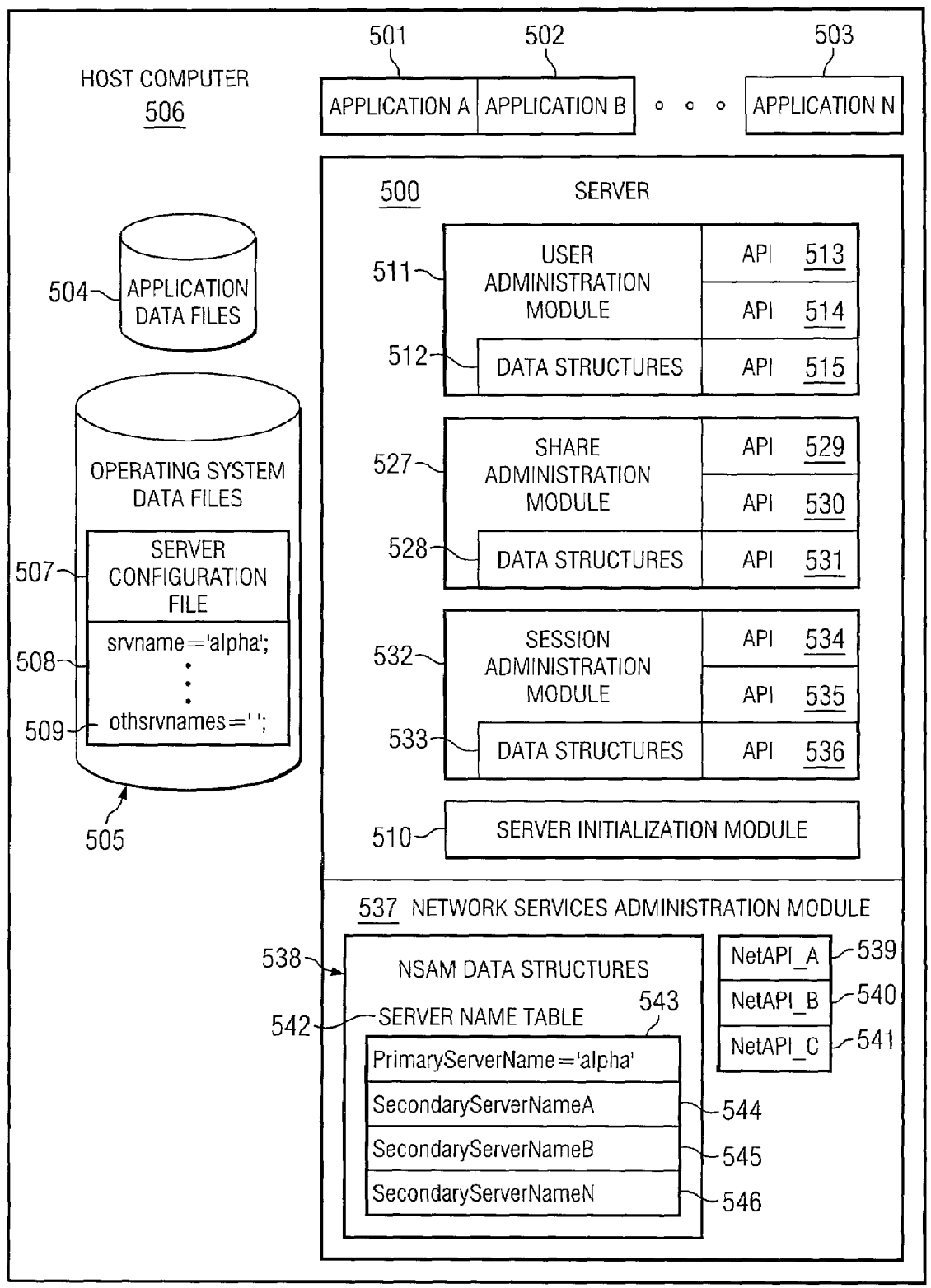
FIG. 5 is a block diagram depicting software components within a server that provides for multiple network names on the server.

With reference now to FIG. 5, a block diagram depicts software components within a server that provide for multiple network names on the server. Application 501, application 502, and application 503 execute on host computer 506 to provide a variety of data processing services. One of these applications may include third party software that enhances a user's ability to configure server 500 for a variety of enterprise applications, such as migration of servers or fail-over recovery. Application data files 504 may contain data storage for applications 501–503. Operating system data files 505 for host computer 506 may keep various types of information necessary to the proper functioning of the computer. One of the data files within operating system data files 505 may be server configuration file 507 that contains configuration parameters 508 and 509. In this example, server 500 is shown configured with a single server name. Alternatively, the configuration parameters may be stored in an initialization file, such as a .INI file.

Server 500 may have a variety of modules within it. These modules may be logical groupings of data structures and functions or APIs for performing various duties. Logical separation and inclusion of software within a computer in this manner is well known in the art. Server initialization module 510 initializes or configures server 500 by reading various files, such as server configuration file 507. User administration module 511 contains data structures 512 and APIs 513–515 for providing maintenance of user information and accounts on server 500. Various input and output devices that are not shown in FIG. 5 may provide user interaction capabilities for server 500 and applications 501–503.

Share administration module 527 has data structures 528 and APIs 529–531 that provide registration and use of various shares within the network environment. Session administration module 532 has data structures 533 and APIs 534–536 that provide registration and use of sessions within the network environment.

Network services administration module (NSAM) 537 has data structures 538 and APIs 539–541 that provide access to an operating system interface for network services. NSAM 537 is similar to the NSAMs shown in FIG. 4. While share administration module 527 and session administration module 532 rely heavily on the use of NSAM 537 for linking server 500 with another computer on the LAN, they are not primarily concerned with network communication.

Data structures 538 contain server name table 542 that contains a set of server names, such as primary server name 543 and secondary server names 544–546. The set of server names in server name table 542 may comprise a primary server name and a large, variable number of secondary server names. Only one primary name may be registered per server, but multiple secondary names may be registered per server.

Figure 6:
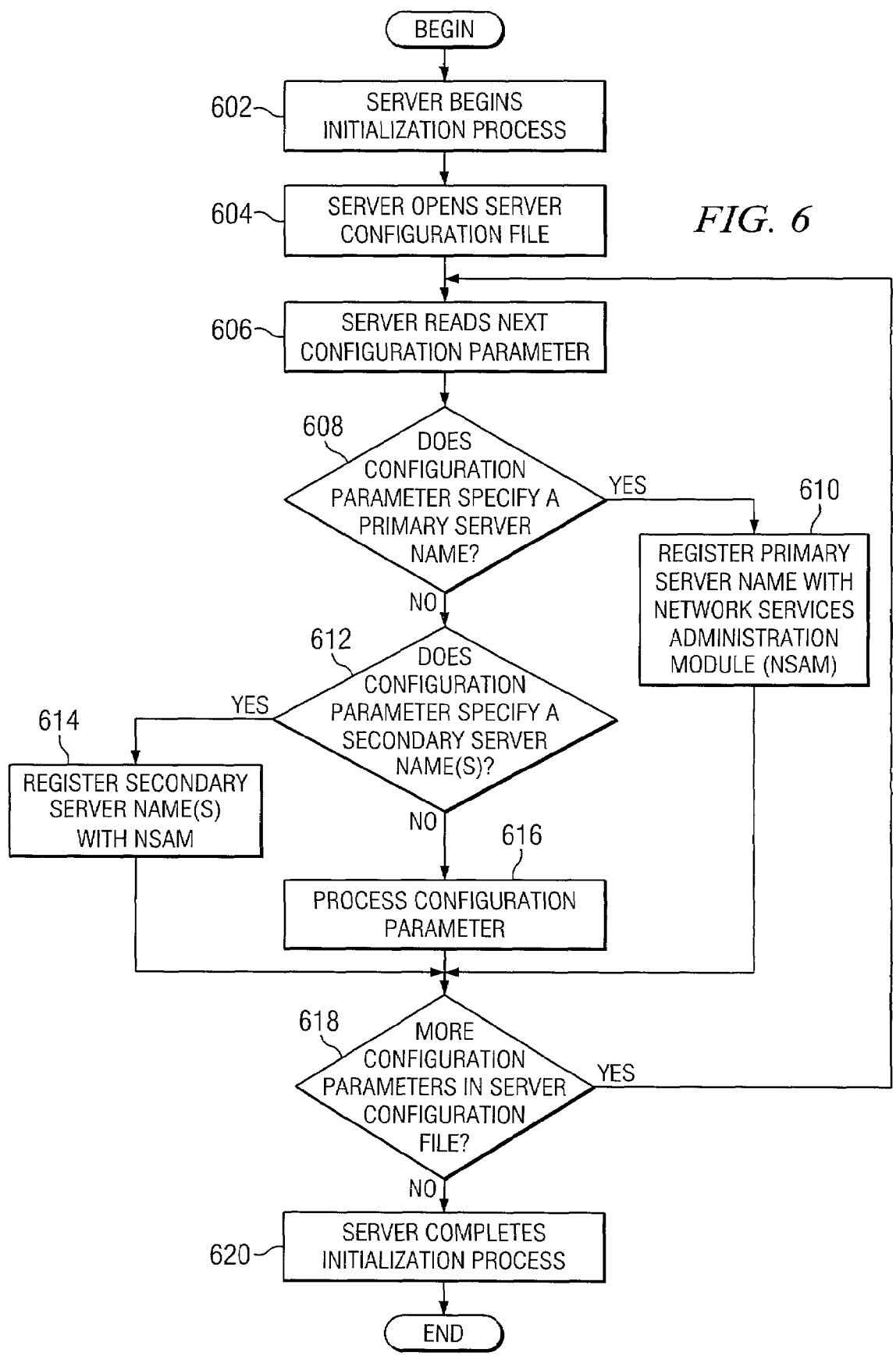
FIG. 6 is a flowchart showing a method in which a single computer may be configured with multiple network names.

With reference now to FIG. 6, a flowchart shows a method in which a single computer may be configured with multiple network names. At some point in time, a server will begin an initialization or configuration process (step 602) during which the server will open and read parameters from a server configuration file (step 604). These parameters may include a variety of data items necessary for the proper configuration of the server.

The server reads a next configuration parameter from the configuration file (step 606) and determines whether the configuration parameter specifies a primary server name (step 608). If so, the primary server name is registered with the Network Services Administration Module (NSAM) (step 610). The process then continues through a loop in which it is determined whether more configuration parameters are contained within the configuration file (step 618). If so, then the process loops back to step 606 to obtain the next configuration parameter.

If the configuration parameter was not a primary server name, a determination is made whether the configuration parameter specifies a secondary server name or names (step 612). If so, the secondary server name or names are registered by the NSAM (step 614) and the process continues to step 618. If the configuration parameter does not specify a secondary server name, then the configuration parameter does not specify a server name, and the configuration parameter is processed in some other manner appropriate for the type of configuration parameter (step 616). Various types of configuration parameters may be stored in the server configuration file that are server-specific. For example, a server that processes business inventory may store information concerning the locations of inventory databases within the server configuration file. The server may read pathname parameters for these databases from the server configuration file and store the pathnames in the appropriate data structures.

The process then continues, at step 618, to check whether other configuration parameters within the configuration file still need to be processed. If not, the server completes the initialization process (step 620). The configuration file should include at least one server name.

Referring back to FIG. 5, an example of a single server name for a computer is shown within configuration file 507 and server name table 542. During the initialization process described in FIG. 6, server initialization module 510 would read server configuration file 507 and process configuration parameters within the file. Configuration file 507 shows configuration parameter 508 named "srvname" with a value equal to "alpha". Configuration file 507 also contains configuration parameter 509 named "othsrvnames" with a value set to the null string. When server initialization module 510 reads these parameters, it will register the server names found in server configuration file 507 with NSAM 537 which then stores the server names within server name table 542. As is shown in FIG. 5, the primary server name stored in configuration file 507 is the same as the primary server name 543 within server name table 542. In this case, server initialization module 510 has read the server name "alpha" and registered the server name with NSAM 537. The server name may be registered through the calling of the appropriate API within NSAM 537, such as one of the APIs 539–541 that provides for registration of a primary server name.

Figure 7:
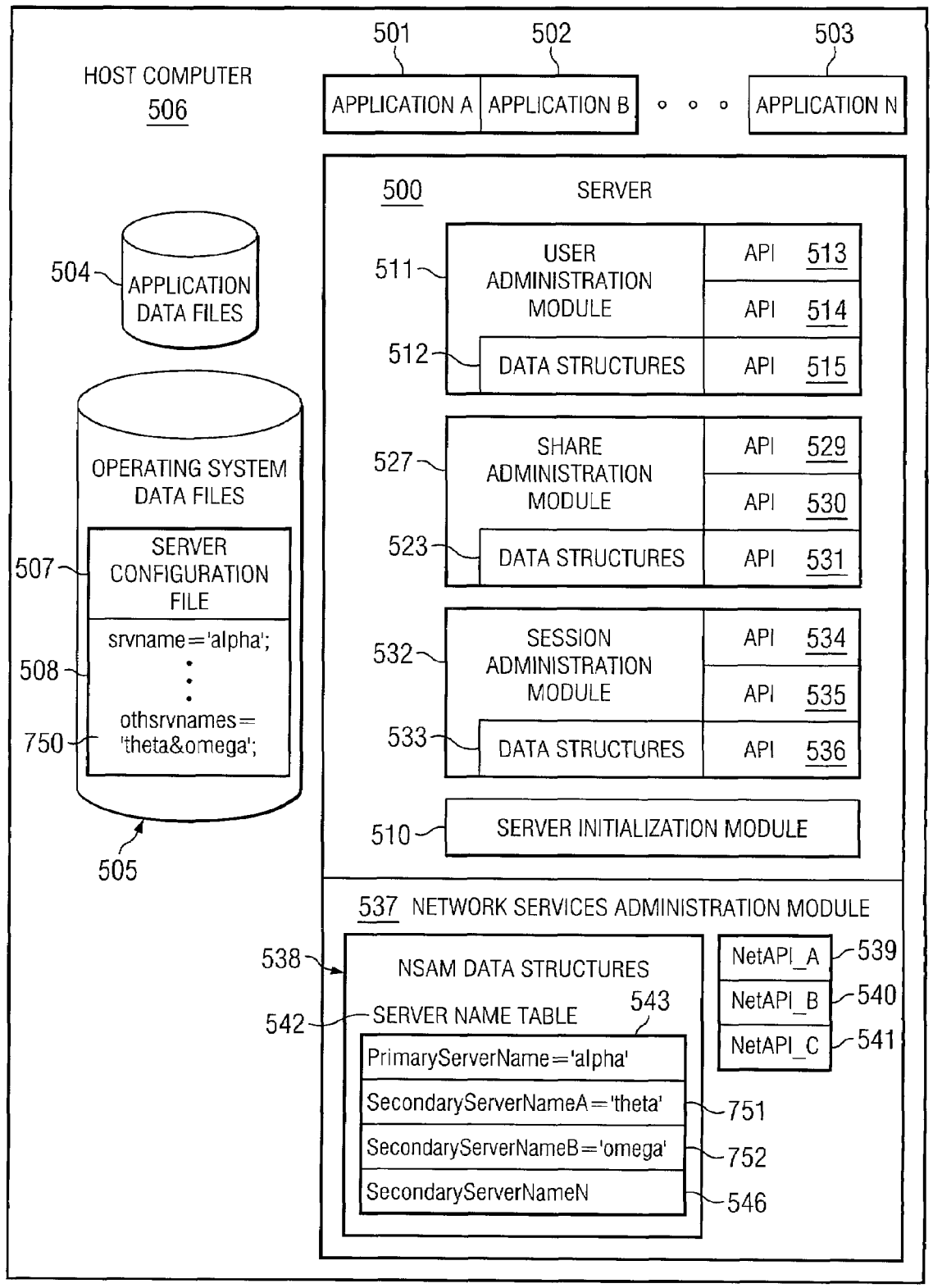
FIG. 7 is a block diagram depicting a single server configured with multiple network names.

With reference now to FIG. 7, a block diagram depicts a single server configured with multiple network names. FIG. 7 is similar to FIG. 5 and similar reference numerals within each figure label similar components. However, the server configuration file now contains a parameter 750 for other server names with a value equal to the string "theta&omega". The server name table also contains newly added secondary server names in which SecondaryServerNameA 751 has a value equal to "theta" and SecondaryServerNameB 752 has a value equal to "omega". In this case, the server initialization module has configured the server by reading multiple network names from the server configuration file and registering the multiple names with the NSAM by calling one of the APIs 539–541 that provides for registration of a server name.

Figure 8:
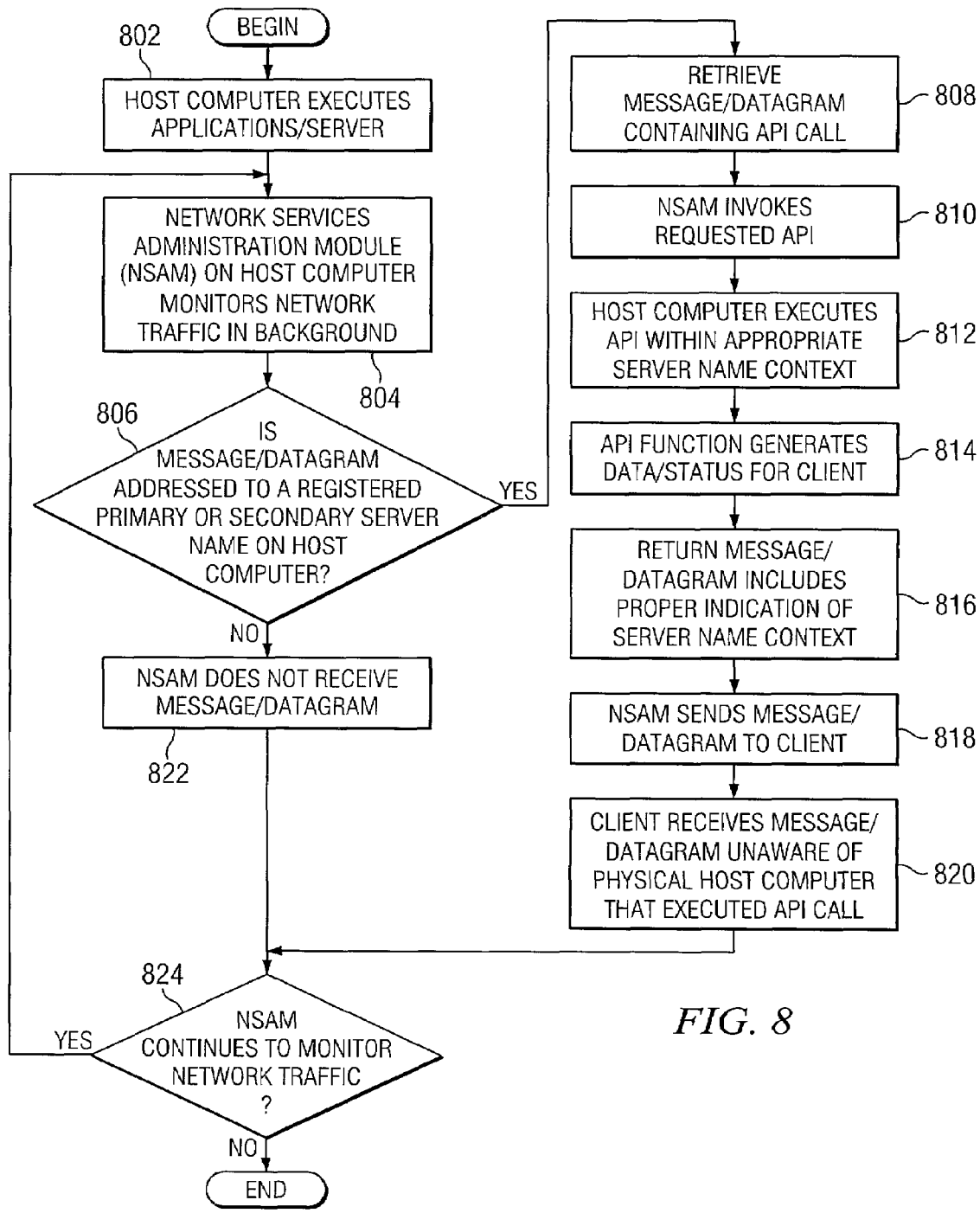
FIG. 8 is a flowchart depicting a process of using multiple network names on a single server to provide data processing services to a client.

With reference now to FIG. 8, a flowchart depicts a process of using multiple network names on a single server to provide data processing services to a client. The process begins when the host computer executes various applications including a server application (step 802). The NSAM on the host computer monitors the network traffic in the background (step 804) until it must determine whether a message/datagram is addressed to a registered primary or secondary server name on the host computer (step 806). If so, the NSAM retrieves the message/datagram containing an API call (step 808) and invokes the requested API that has been directed to the registered server name (step 810). The host computer executes the API within the appropriate server name context (step 812). The API function generates data/status for a client (step 814) and returns a message/datagram that includes the proper indication of the server name context in which the API call was executed (step 816). The NSAM sends the message/datagram to the client (step 818), and the client receives the message/datagram without being aware of the physical host computer that executed the API call (step 820). The process then continues with the NSAM continuing to monitor the network traffic (step 824). If the previous message or datagram was not addressed to a registered primary or secondary server name on the host computer, then the NSAM does not process the message/datagram (step 822). The NSAM then determines whether it should continue to monitor the network traffic (step 824). If so, then the process loops back to step 804. Otherwise, the process terminates.

With reference now to FIGS. 9A–9D, a simplified network diagram provides an example of using multiple network names for a single server. LAN 900 connects clients 901 and 902 with servers 904 and 905. Servers 904 and 905 access shared disk 906. Server 904 has network name "Customers", and server 905 has network name "Inventory". The servers may be monitored by a special application on either server that provides fail-over monitoring capabilities. If so, server 904 and server 905 may be configured to provide active/active redundancy, also known as bi-directional fail-over. In this configuration, mission-critical applications may run on two fully functioning servers that can each stand in for the other when either server fails.

Figure 9A:
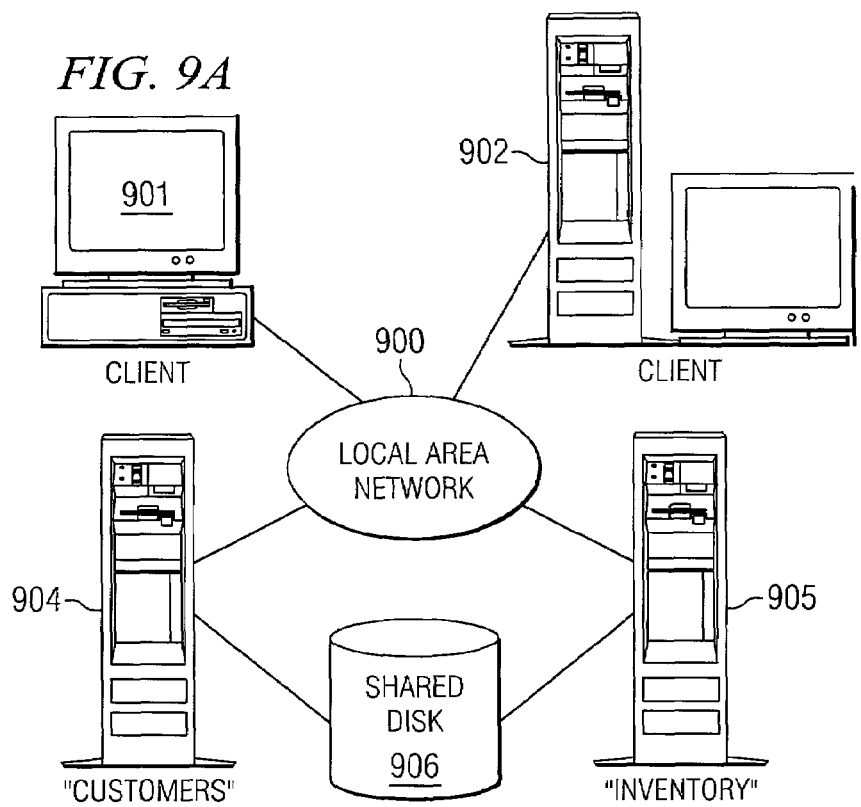
FIGS. 9A–9D are simplified network diagrams providing an example of using multiple network names for a single server.
Figure 9B:
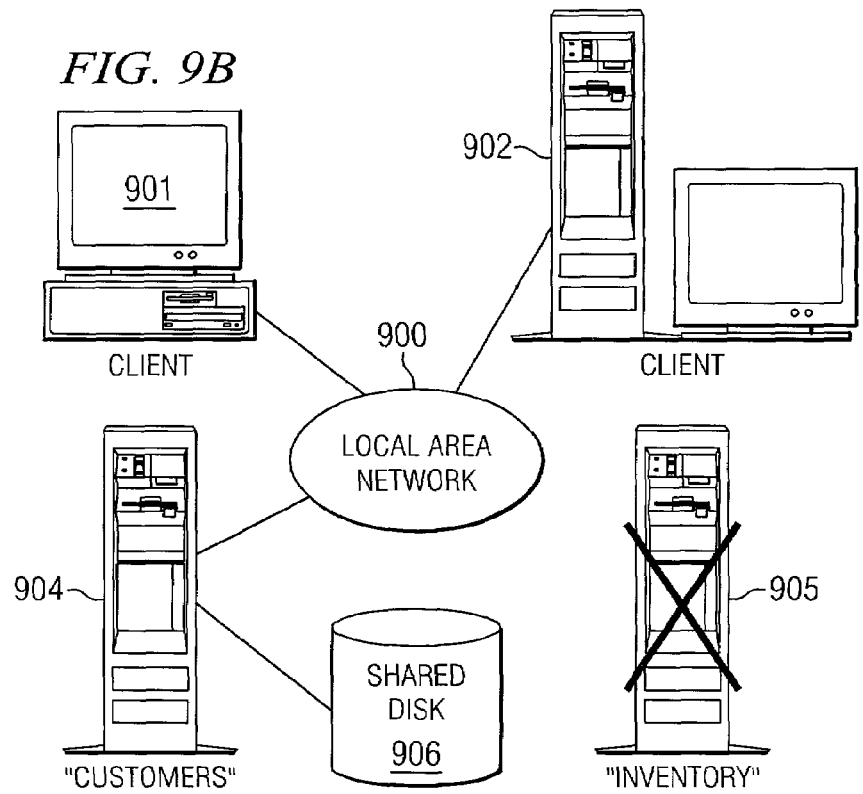

FIG. 9B shows the first step toward recovery in a situation where one server fails and another server assumes the responsibilities of the failed server. In this example, the "Inventory" server may be experiencing some type of hardware problem that either requires intervention in order to shutdown the server or automatically causes the server to shutdown. In either of those cases, server 905 eventually loses communication with local area network 900. This failure does not immediately affect the "Customers" server.

Figure 9C:
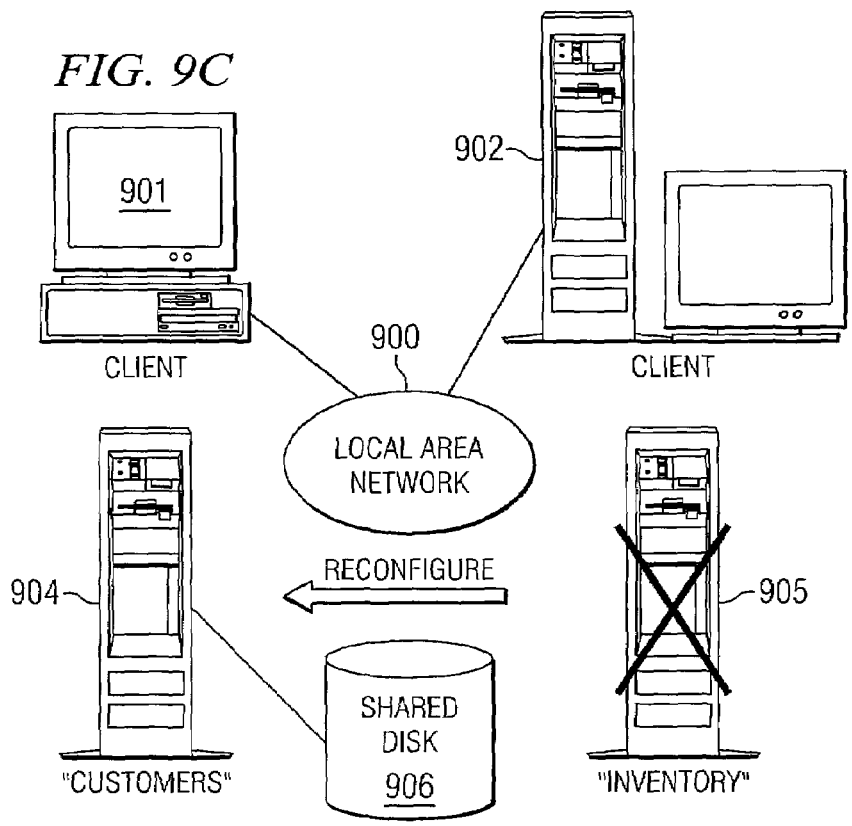

FIG. 9C shows that server 905 is still disconnected from local area network 900, and server 904 has been disconnected from local area network 900 in order to reconfigure the "Customers" server to assume the duties of the failed "Inventory" server.

Server 904 may be reconfigured in a variety of manners. In a manual reconfiguration process, a system administrator may have been manually monitoring the performance of the servers and noticed the shutdown of server 905 or was alerted in some manner of the shutdown of server 905. The system administrator may use a command line interface or graphical user interface in order to input commands to server 904 that will disconnect it from the local area network and begin a reconfiguration process. The system administrator may input the commands and receive display information from input and output devices connected to server 904 that are not shown in FIGS. 9A–9B.

In order for server 904 to assume the responsibilities of server 905, server 904 must be given the network name of server 905 so that it may respond to processing requests, e.g., from clients 901 and 902 across local area network 900, that previously would have been processed by server 905. The system administrator may add the previous network name of server 905, i.e. "Inventory", to the configuration file of server 904. Server 904 previously had a sole server name, i.e. a primary server name of "Customers," and the system administrator places a secondary server name of "Inventory" in the configuration file of server 904. The new server name may be added to the configuration file either by simple text editing of the configuration file or through some system utility provided for this purpose.

At some point, server 904 is restarted or halted/stopped and restarted. The server initialization module on server 904 will read the primary and secondary server names from the configuration file and register these network names in the server name table of the network services administration module of server 904. At that point, server 904 is ready to recognize server requests, e.g., requests from clients on the local area network, for both server "Customers" and server "Inventory".

Instead of a manual process for reconfiguring server 904, some type of system program or third party software may monitor the fail-over condition of servers 904 and 905 specifically for the failure of one of the servers so that the other server may be automatically reconfigured. In this case, the failure of server 905 is automatically detected, and the fail-over software automatically begins the reconfiguration process for server 904. In the example of FIG. 9C, the "Inventory" server fails and the "Customers" server is automatically disconnected from local area network 900. The fail-over software may also bring down other applications as necessary that may have been executing on server 904 when the determination was made to reconfigure it. The fail-over software must enable server 904 to recognize the server name of failed server 905. The fail-over software may insert the "Inventory" server name of failed server 905 as a secondary server name in the configuration file of server 904 and then bring reconfigured server 904 back on-line.

Figure 9D:
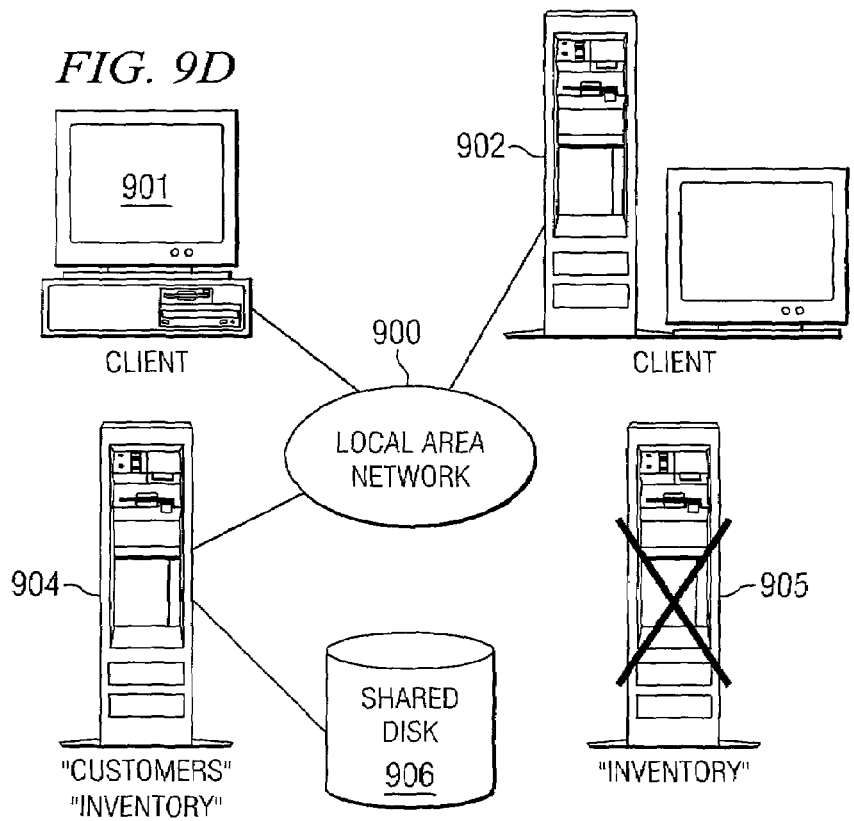

FIG. 9D shows the result of reconfiguring server 904 to recognize multiple network names on a single server. Server 904 has been reconfigured to recognize its original primary server name "Customers" and a new secondary server name "Inventory" that matches the previously used primary network name of server 905, i.e. "Inventory". Server 904 has been reconfigured either through a manual process from a system administrator or through an automatic reconfiguration process from a fail-over application executing on server 904. In either case, server 904 may be given the additional network name by placing a secondary server name in its configuration file and bringing it back on-line. Server 904 may be reconnected to local area network 900 by restarting the network services administration module in a manner which allows communication to be reestablished between server 904 and clients 901 and 902 as shown in FIG. 9D.

Server 904 has access to the information previously stored by server 905 on shared disk 906. Alternatively, server 904 has access to a copy or replica of the information previously stored by server 905. Coherency and synchronization techniques for replicating files and disks are well-known in the art. When a client sends a request to the server named "Inventory", the appropriate application on server 904 may access inventory-related information on shared disk 906 and respond appropriately to the requesting client. Server 904 may also continue its responsibilities responding to requests for server name "Customers". Depending on the amount of time spent reconfiguring server 904, a user on either client 901 or client 902 may experience only minor interruptions in responses received from servers on local area network 900 that respond to their requests.

Figure 10A:
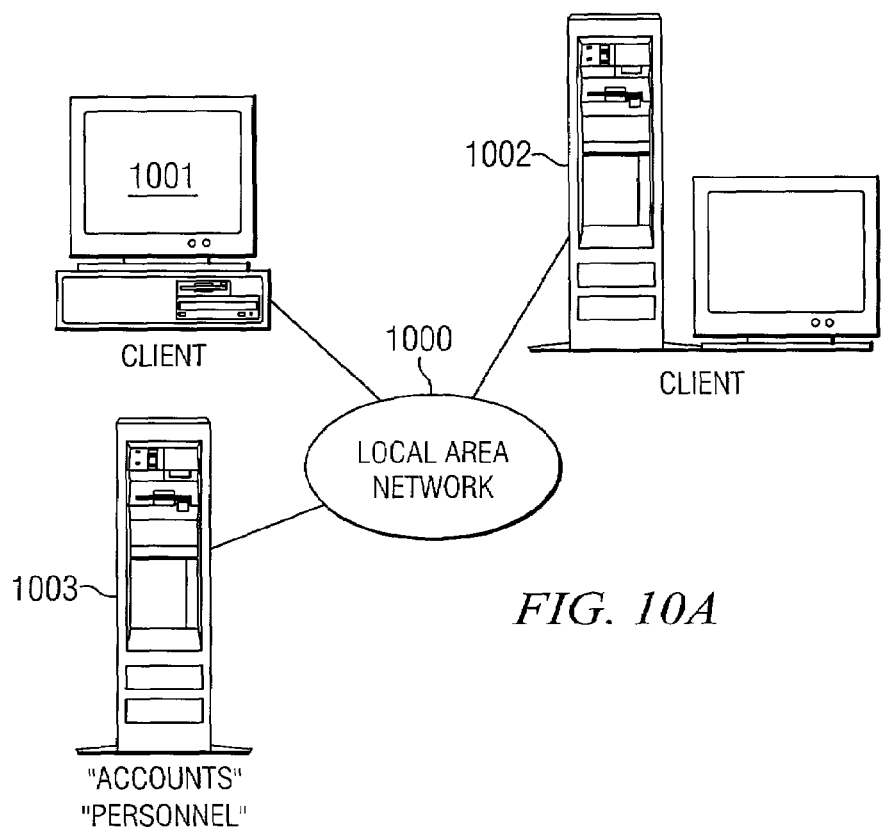
FIGS. 10A–10C are simplified network diagrams depicting a migration scenario in which a server that is initially configured to respond to multiple server names is reconfigured so that multiple servers may respond to those server names.
Figure 10B:
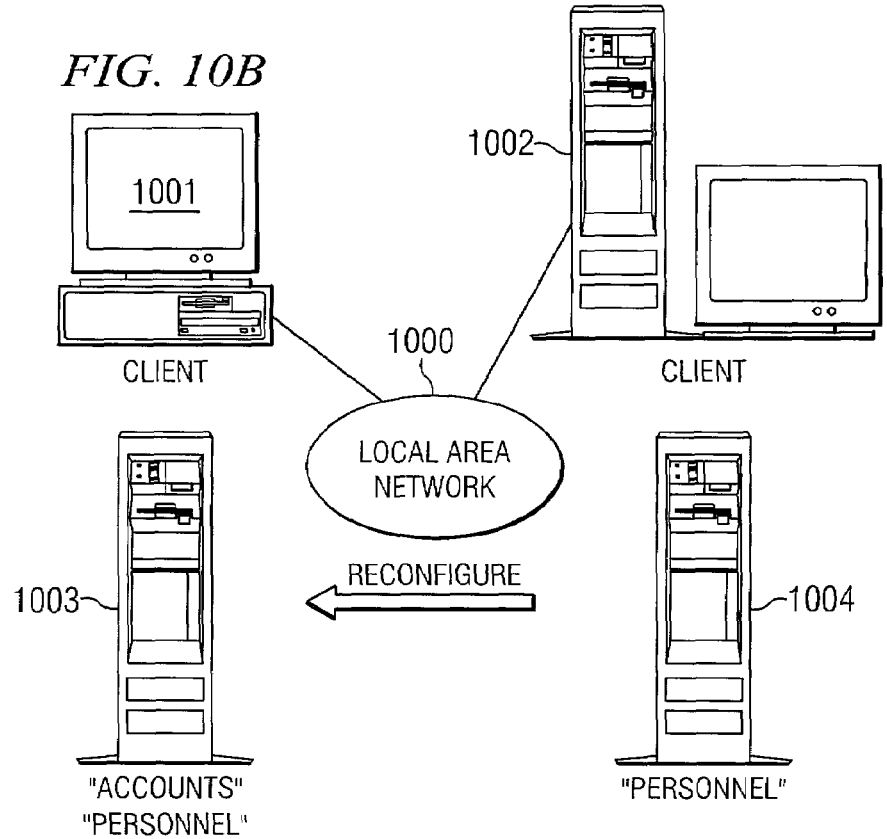
Figure 10C:
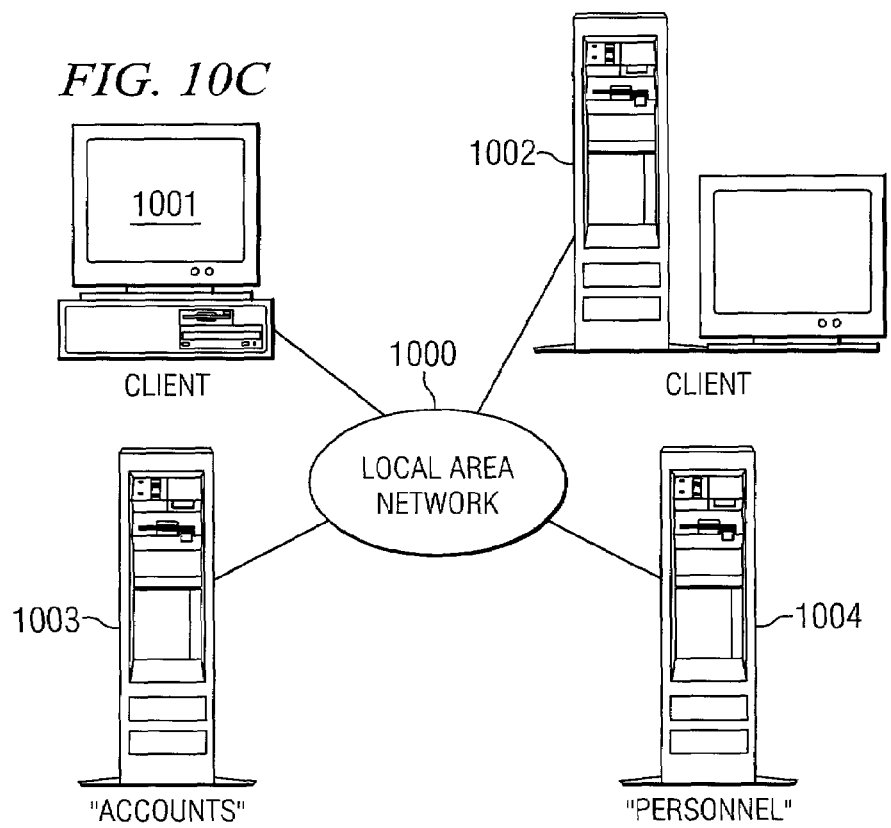

With reference now to FIGS. 10A–10C, simplified network diagrams depict a migration scenario in which a server that is initially configured to respond to multiple server names is reconfigured so that multiple servers may respond to those server names. FIG. 10A shows local area network 1000 connecting client 1001, client 1002, and server 1003. Server 1003 has a primary server name of "Accounts" and a secondary server name of "Personnel". Server 1003 responds to requests from clients 1001 and 1002 using these multiple server names. Clients 1001 and 1002 are not aware that the server named "Accounts" and the server named "Personnel" are actually a single physical host computer shown supporting server 1003.

FIG. 10B shows the introduction of a new server 1004 that is already configured with a primary server name of "Personnel". Server 1004 has not yet been connected to local area network 1000, and server 1003 has been disconnected from local area network 1000 in order to reconfigure it so that it stops responding to requests directed to a server named "Personnel".

Server 1003 may be reconfigured in either a manual or an automatic process. If a manual process is being used to reconfigure server 1003, a system administrator may remove the secondary server name "Personnel" from the configuration file of server 1003 and then restart server 1003 or restart its network services administration module in order to reestablish a communication link between server 1003 and local area network 1000. If an automatic process is used to reconfigure server 1003, a system utility or some type of server-migration software application may be used to automatically take server 1003 off-line, change its reconfiguration file to remove a secondary server name, and then reestablish communications between server 1003 and local area network 1000.

FIG. 10C shows a network configuration in which communications have been reestablished between server 1003 and local area network 1000, and server 1004 has been connected to local area network 1000 and brought on-line. Server 1003 has been reconfigured so that it responds only to client requests directed to a server named "Accounts". Server 1004 responds to requests directed to a server named "Personnel". In this manner, some of the processing responsibilities of server 1003 have been migrated to server 1004 without affecting the manner in which clients 1001 and 1002 request and receive data. Clients 1001 and 1002 are not aware that the servers named "Accounts" and "Personnel" originally resided on a single physical host computer and have been readjusted so that server "Accounts" and server "Personnel" reside on two physical host computers connected to the same local area network.

This type of migration scenario may be required when the processing load on server 1003 becomes too great through the addition of demanding clients to the local area network. By splitting the servers across multiple host computers, a system administrator may provide better response times to customers or employees using enterprise applications across the local area network. The disruption caused by the temporary disconnect of server 1003 from the local area network may be rather minor depending on the amount of time used to reconfigure server 1003. The amount of downtime or inconvenience noticed by users of clients 1001 and 1002 may be minimized through the use of automatic reconfiguration software that facilitates the migration of servers from one computer or another using the mechanism of multiple network names for a single server described above.

Figure 11:
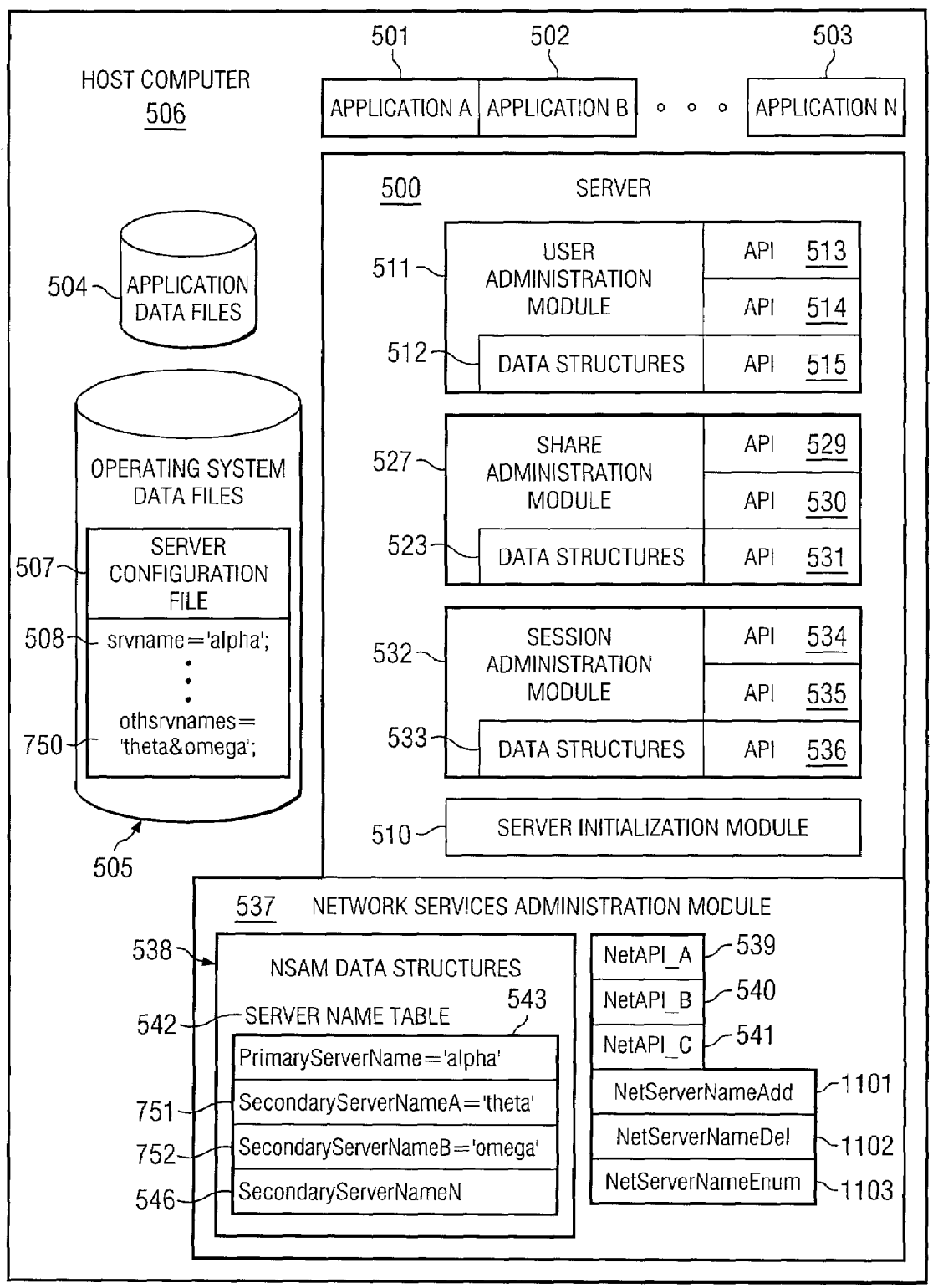
FIG. 11 is a block diagram depicting the system components for a host computer whose capabilities have been extended to include the dynamic addition and removal of multiple network names on a single server.

With reference now to FIG. 11, a block diagram depicts the system components for a host computer whose capabilities have been extended to include the dynamic addition and removal of multiple network names on a single server. FIG. 11 is similar to FIGS. 5 and 7, and similar numerals in each figure represent similar system components within the server. However, new network APIs 1101–1103 have been added to NSAM 537 that already contained APIs 539–541. NetServerNameAdd 1101, NetServerNameDel 1102, and NetServerNameEnum 1103 provide operating system capabilities for adding, removing, and enumerating dynamic, multiple server names so that applications may call these APIs to perform server name context functions in server 500 "on the fly". In other words, the system capabilities are extended by incorporating APIs that dynamically modify the membership of a set of server names for the server. Alternatively, the services performed within the APIs may also be performed by procedures, functions, methods, objects, and subroutines within the system.

The NetServerNameAdd(server,name) API will instruct a server named in the "server" parameter to begin responding to requests for the specified server name in the "name" parameter. The NetServerNameDel(server,name) API will instruct the server named in the "server" parameter to stop responding to requests for the specified server name in the "name" parameter, i.e. "delete" the server name. The NetServerNameEnum(server) API will return a list of network names to which the server named "server" is responding, i.e. "enumerate" the server names.

Figure 12:
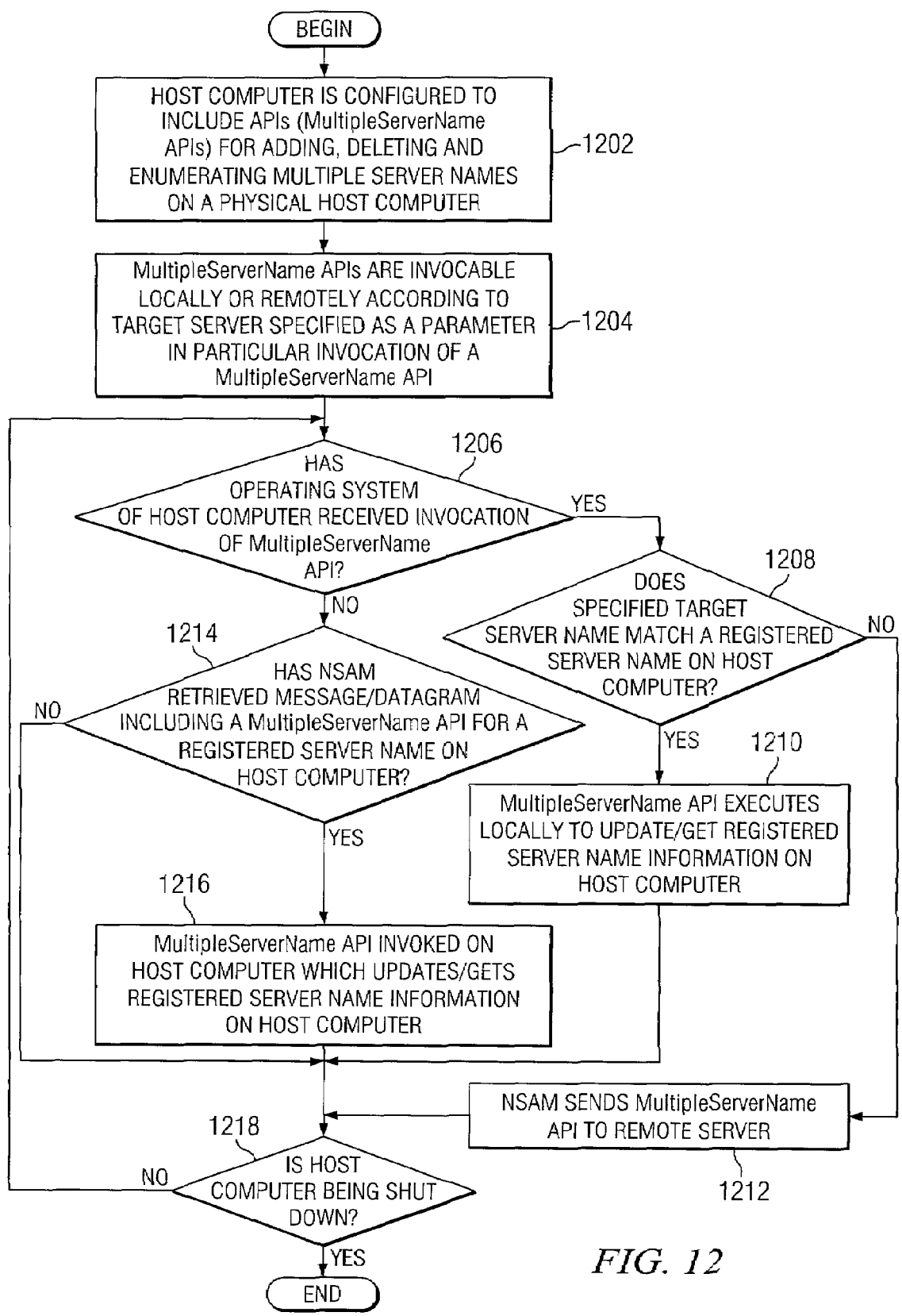
FIG. 12 is a flowchart depicting the manner in which APIs may be used for dynamic addition and removal of multiple network names on a single server.

With reference now to FIG. 12, a flowchart depicts the manner in which APIs may be used for dynamic addition and removal of multiple network names on a single server. The process begins when a host computer is configured to include APIs for adding, deleting, and enumerating multiple server names on a physical host computer (step 1202). For example, these APIs may include NetServerNameAdd, NetServerNameDel, and NetServerNameEnum as described with respect to FIG. 11. Other APIs may be provided that use a different syntax or provide some other equivalent manner of dynamically modifying the set of multiple network names for a single server.

These APIs may be logically grouped and referred to as MultipleServerName APIs. MultipleServerName APIs are invokable locally or remotely according to the target server specified as a server name parameter in a particular invocation of a MultipleServerName API (step 1204). In other words, an application on the host computer may call one of the MultipleServerNames APIs with a server name parameter that will direct the execution of the APIs to either execute locally on the same host computer or direct the APIs to execute on a remote computer that is identifiable by the target server name.

The specification of the location for the execution for an API may be performed in a variety of ways. For example, the LAN Server network application programming interface allows for most all of its network API calls to specify a pointer to a server name as the first field in the API parameters. If the pointer to the server name is NULL or a null string, then the API executes at the local machine; otherwise, the server name pointer points to a string containing the name of the machine at which the API call should execute. In this manner, the server name allows for a type of remote procedure calling (RPC) convention. Various RPC protocols could be used providing a server allows for various underlying RPC mechanisms to be used.

A determination is made as to whether the host computer has received an invocation of a MultipleServerName API (step 1206). If so, a further determination is made as to whether the target server name specified as a parameter in the API call matches a registered server name on the host computer (step 1208). If so, then the MultipleServerName API executes locally on the host computer to update or get registered server name information on the host computer (step 1210). If there is no match between the target server name specified as the parameter in the MultipleServerName API and a registered server name on the host computer, the NSAM then sends the MultipleServerName API onto the network to direct the API call to a remote server (step 1212). After the host computer processes the local invocation of the MultipleServerName API, the process continues with a determination as to whether the host computer should continue processing or is being shut down (step 1218). If the host computer is to continue processing, the method loops back to step 1206.

If the host computer has not received a local invocation of a MultipleServerName API, the NSAM continues to monitor the network traffic and attempts to determine whether a message/datagram directed to a server name on the host computer includes a MultipleServerName API for a registered server name on the host computer (step 1214). If so, then the MultipleServerName API is invoked on the host computer, which updates or gets registered server name information on the host computer (step 1216). If not, the process continues to step 1218 to continue the loop for general monitoring of events.

The utility of having a set of MultipleServerName APIs for dynamically adding and removing multiple network names for a single server may be shown with reference again to FIGS. 9C and 10B. In FIG. 9C, using the previous method, server 904 was reconfigured in a manual or an automatic process in which an additional network name was added to server 904. In FIG. 10B, using the previous method, server 1003 was reconfigured to remove a secondary server name that was then added to a new server 1004. In each of these cases, a server name was added or removed through the use of a configuration file that required a restart of the server containing the configuration file. Configuration parameters within the configuration file included the primary and secondary server names that were read by a server initialization module that registered the server names with the network services administration module. The use of the configuration file for storing primary and secondary server names is a rather "static" mechanism for changing the network names to which the host computer will respond.

The MultipleServerName APIs shown in FIG. 11, and further described in the method depicted in the flowchart of FIG. 12, allow dynamic addition and removal of server names without the cumbersome process of editing or changing a configuration file. The use of a configuration file requires the disconnect and subsequent reconnect of a server from the local area network and the temporary disruption of services to the client on the local area network.

With reference now to FIGS. 13A–13D, a simplified network diagram depicts a method of providing bi-directional fail-over capability using the dynamic addition and removal of multiple network names for a single server according to the present invention. FIGS. 13A–13D are similar to FIGS. 9A–9D except that the server names in FIGS. 13A–13D may be reconfigured dynamically rather than statically as shown in FIGS. 9A–9D.

Figure 13A:
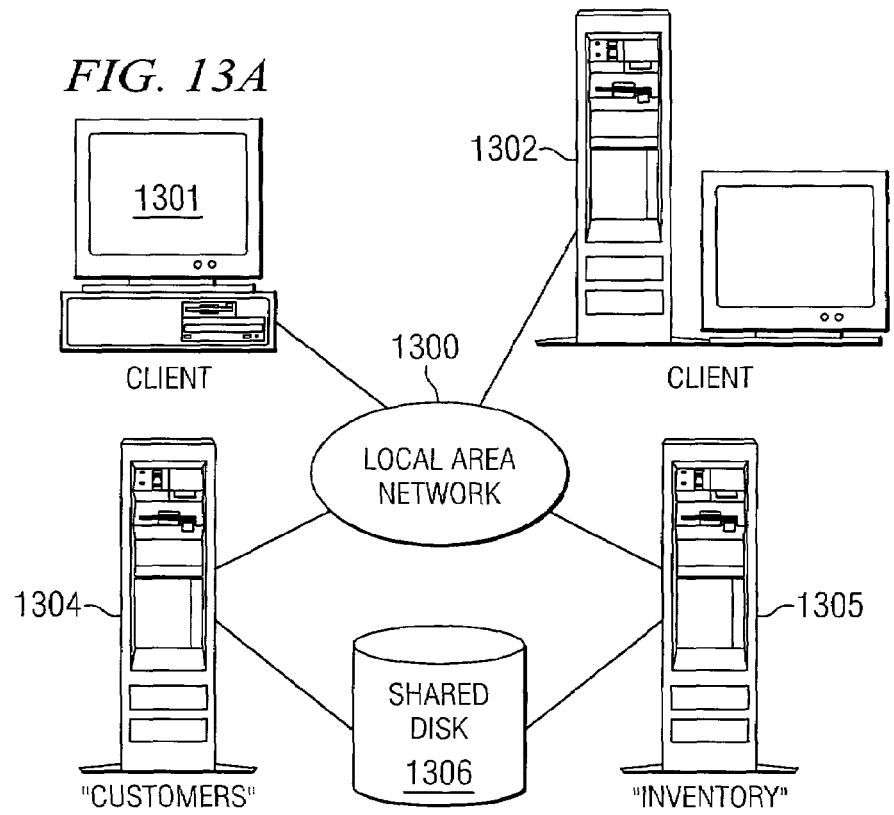
FIGS. 13A–13D are simplified network diagrams depicting a method of providing bi-directional fail-over capability using the dynamic addition and removal of multiple network names for a single server according to the present invention.

In FIG. 13A, LAN 1300 connects clients 1301 and 1302 with servers 1304 and 1305. Servers 1304 and 1305 access shared disk 1306. Server 1304 has network name "Customers", and server 1305 has network name "Inventory". The servers may be monitored by a special application on either server that provides fail-over monitoring capabilities. If so, server 1304 and server 1305 may be configured to provide active/active redundancy, also known as bi-directional fail-over. In this configuration, mission-critical applications may run on two fully functioning servers that can each stand in for the other when either server fails.

Figure 13B:
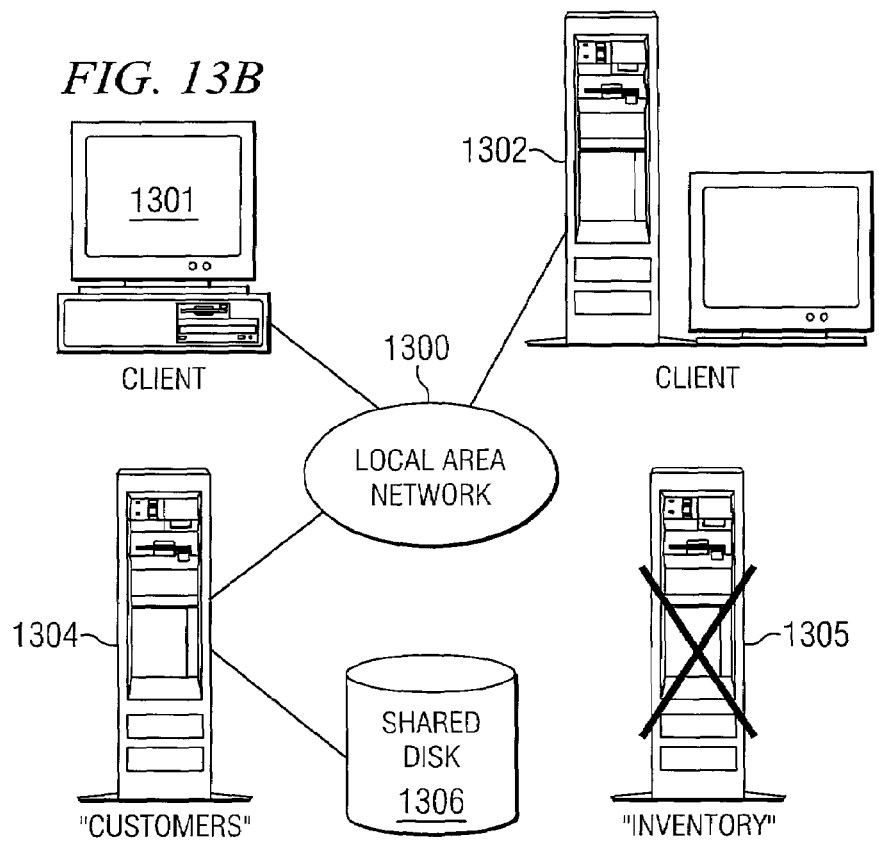

FIG. 13B shows the first step toward recovery in a situation where one server fails and another server assumes the responsibilities of the failed server. Server 1305 eventually loses communication with local area network 1300.

Figure 13C:
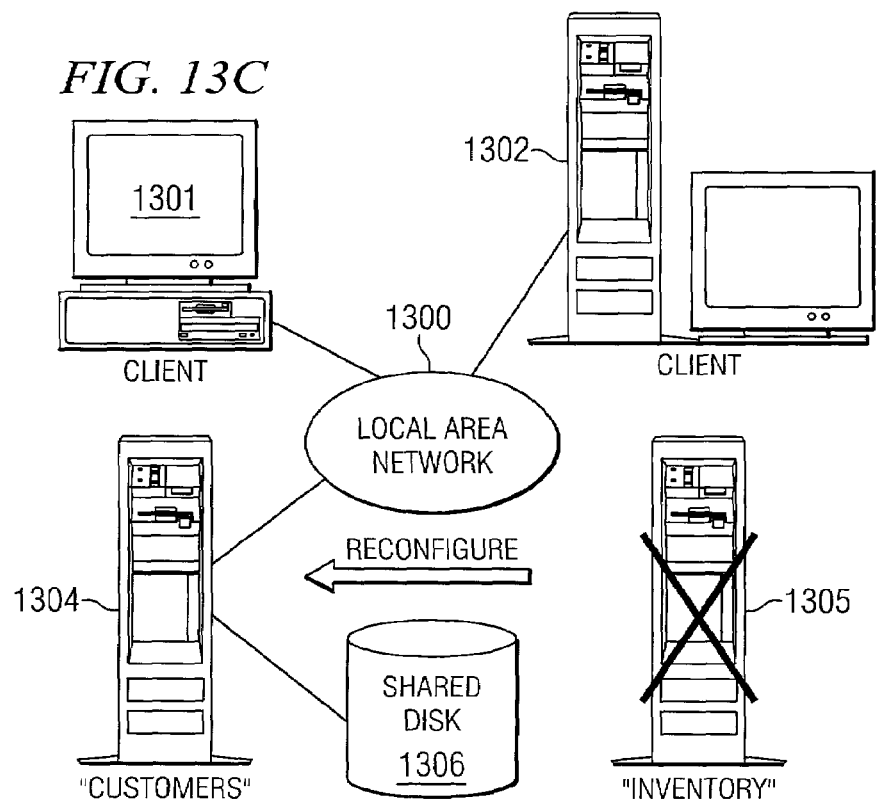

FIG. 13C shows that server 1305 is still disconnected from local area network 1300. However, server 1304 remains connected to local area network 1300 while being reconfigured to assume the duties of the failed "Inventory" server in addition to the duties of the "Customers" server.

Server 1304 may be reconfigured in a variety of manners. In a manual reconfiguration process, a system administrator may have been manually monitoring the performance of the servers and noticed the shutdown of server 1305 or was alerted in some manner of the shutdown of server 1305. The system administrator may use a command line interface or graphical user interface in order to input commands to server 1304 that begin a reconfiguration process. The system administrator may input the commands and receive display information from input and output devices connected to server 1304 that are not shown.

In order for server 1304 to assume the responsibilities of server 1305, server 1304 must be given the network name of server 1305 so that it may respond to processing requests, e.g., from clients 1301 and 1302 across local area network 1300, that previously would have been processed by server 1305. Either by commands from the system administrator or through some type of fail-over software, an API discussed in FIG. 12 may be called in order to dynamically add an additional network name for the server. At that point, server 1304 is ready to recognize server requests, e.g., requests from clients on the local area network, for both server "Customers" and server "Inventory".

Figure 13D:
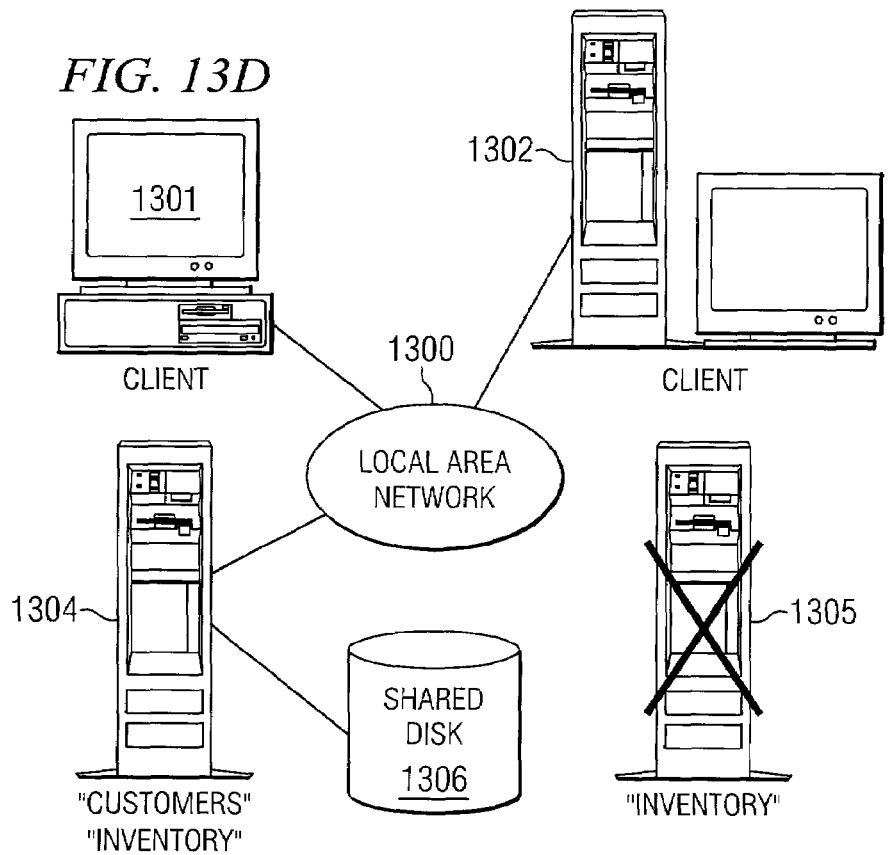

FIG. 13D shows the result of reconfiguring server 1304 to recognize multiple network names on a single server. Server 1304 has been reconfigured to recognize its original primary server name "Customers" and a new secondary server name "Inventory" that matches the previously used primary network name of server 1305.

Figure 14A:
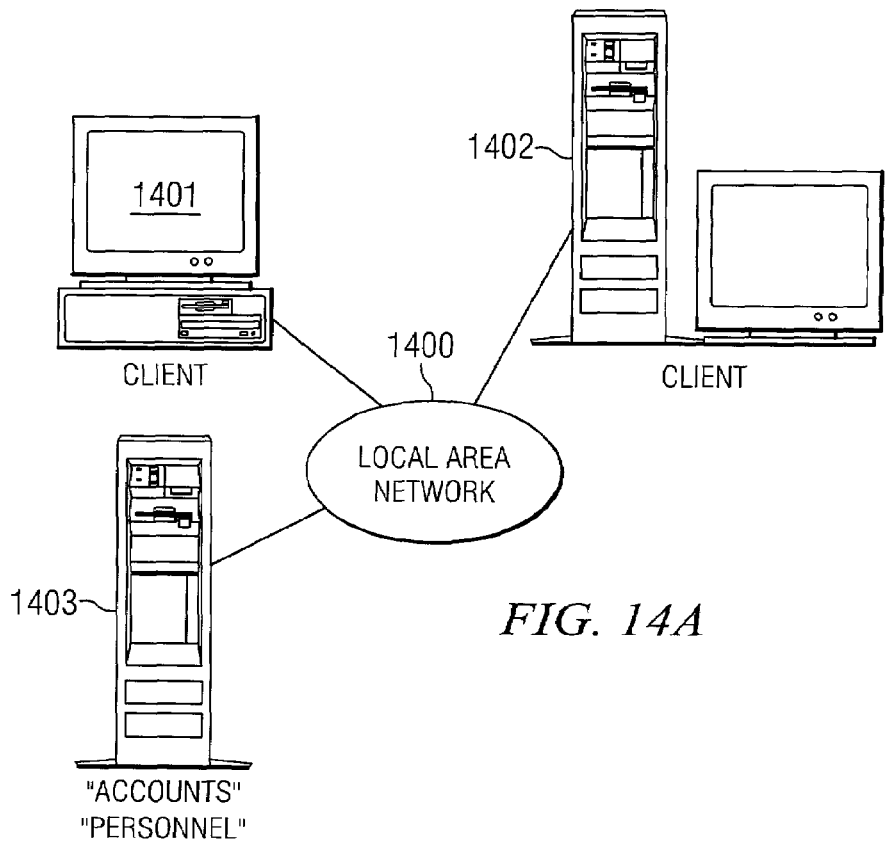
FIGS. 14A–14C are simplified network diagrams depicting an environment in which a migration scenario may be implemented using the method for dynamic addition and removal of multiple network names on a single server according to the present invention.
Figure 14B:
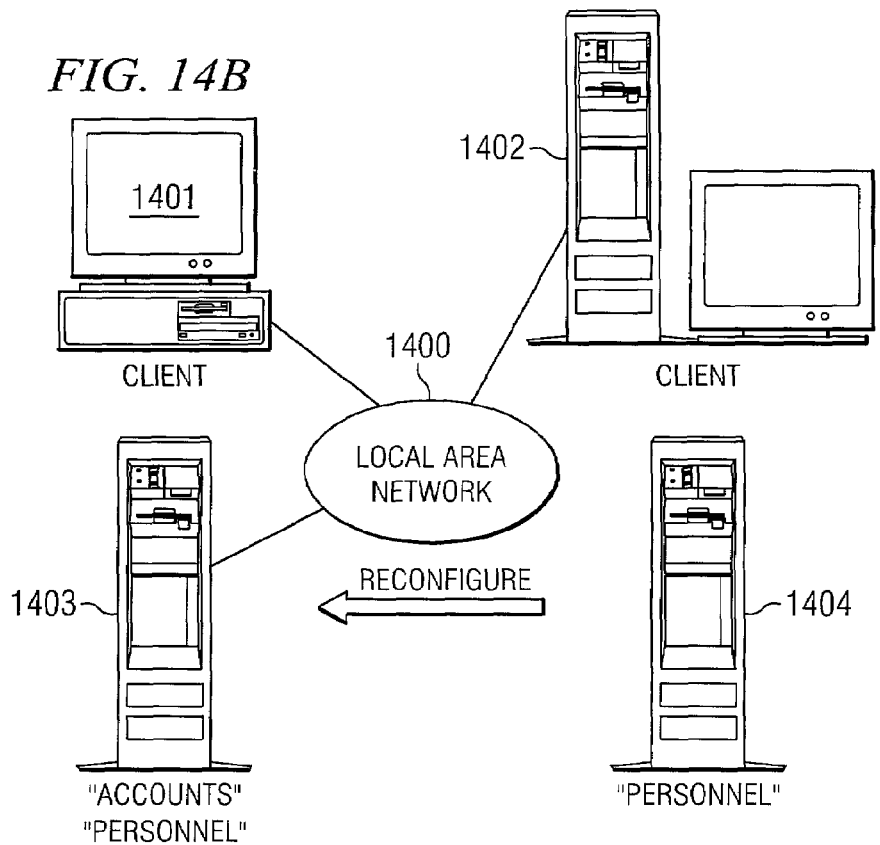
Figure 14C:
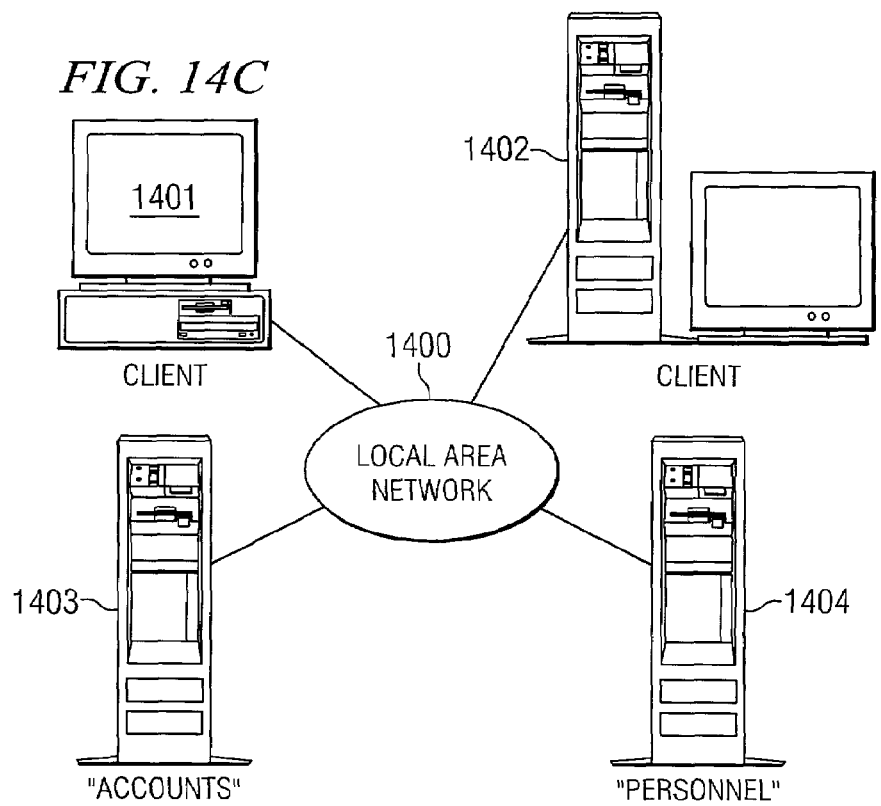

With reference now to FIGS. 14A–14C, a simplified network diagram depicts an environment in which a migration scenario may be implemented using the method for dynamic addition and removal of multiple network names on a single server according to the present invention. FIGS. 14A–14C are similar to FIGS. 10A–10C except that the server names in FIGS. 14A–14C may be reconfigured dynamically rather than statically as shown in FIGS. 10A–10C.

FIG. 14A shows local area network 1400 connecting client 1401, client 1402, and server 1403. Server 1403 has a primary server name of "Accounts" and a secondary server name of "Personnel". Server 1403 responds to requests from clients 1401 and 1402 using these multiple server names. Clients 1401 and 1402 are not aware that the server named "Accounts" and the server named "Personnel" are actually a single physical host computer shown supporting server 1403.

FIG. 14B shows the introduction of a new server 1404 that is already configured with a primary server name of "Personnel". Server 1404 has not yet been connected to local area network 1400.

In order for server 1404 to assume some of the responsibilities of server 1403, server 1403 must relinquish its server name "Personnel". In order to dynamically change the set of server names on server 1403, an API discussed in FIG. 12 may be called in order to dynamically remove a network name for the server.

Server 1403 may be reconfigured in either a manual or an automatic process. If a manual process is being used to reconfigure server 1403, a system administrator may use a command line interface or graphical user interface in order to input commands to server 1403 that begin a reconfiguration process. The system administrator may use input and output devices connected to server 1403 that are not shown. If an automatic process is used to reconfigure server 1403, a system utility or some type of server-migration software application may be used to remove a secondary server name. In either case, an API would be called in response to the manually entered commands or the automated process. The API dynamically removes the server name "Personnel" from server 1403 without halting or restarting server 1403 or its host computer.

FIG. 14C shows a network configuration in which server 1403 has been reconfigured, and server 1404 has been connected to local area network 1400 and brought on-line. Server 1403 has been reconfigured so that it responds only to client requests directed to a server named "Accounts". Sewer 1404 responds to requests directed to a server named "Personnel". In this manner, some of the processing responsibilities of server 1403 have been migrated to server 1404 without affecting the manner in which clients 1401 and 1402 request and receive data, i.e. server 1403 has been reconfigured "on the fly". Server 1403 was not disconnected from network 1400 in order to perform the reconfiguration. Clients 1401 and 1402 are not aware that the servers named "Accounts" and "Personnel" originally resided on a single physical host computer and have been readjusted so that server "Accounts" and server "Personnel" reside on two physical host computers connected to the same local area network.

The advantage of using mutiple network names on a single server are readily apparent in light of the detailed description of the invention above. Throughout any reconfiguration scenario for a server, the client-side perspective remains constant. The clients on the network may continue to send requests to a server using the same server name without reconfiguring the clients.

Using multiple server names for a single server is useful in a variety of scenarios encountered by network administrators. Maintenance of the computer system may be scheduled on a regular basis while minimizing the disruption in the availability of a server. When old hardware is replaced by new hardware, a server may be migrated to an existing hardware platform while the new hardware is brought online and then migrated to the new hardware platform. During consolidation of multiple servers from multiple host computers to a single, larger host computer with more processing power, servers may be migrated to the new platform one at a time by adding the server names to the larger platform.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for configuring a server in a distributed data processing system, the method comprising the computer-implemented steps of:

receiving a request for a function wherein the request comprises an input specifying a first server name and an input specifying a second server name, wherein the server is configured to respond to requests directed to a set of server names comprising the first server name; and executing the function on the server as directed by the input specifying the first server name, wherein the function dynamically modifies a membership of the second server name in the set of server names.

2. The method of claim 1 wherein the membership of the second server name in the set of server names is dynamically added to to set of server names by registering the second server name for the server.

3. The method of claim 1 wherein the membership of the second sever name in the set of server names is dynamically removed from the set of server names by deregistering the second server name for the server.

4. The method of claim 1 wherein the function dynamically modifies the set of server names without halting or restarting the server.

5. The method of claim 1 wherein the request for the function is received from a network.

6. The method of claim 1 wherein the set of server names comprises a plurality of server names.

7. A data processing system comprising:

means for receiving a request for a function, wherein the request comprises an input specifying a first server name and an input specifying a second server name, wherein the server is configured to respond to requests directed to a set of server names comprising the first server name; and means for executing the function on the server as directed by the input specifying the first server name, wherein the function dynamically modifies a membership of the second server name in the set of server names.

8. The data processing system of claim 7 wherein the membership of the second server name in the set of server names is dynamically added to the set of server names by registering the second server name for the server.

9. The data processing system of claim 7 wherein the membership of the second server name in the set of server names is dynamically removed from the set of server names by deregistering the second server name for the server.

10. The data processing system of claim 7 wherein the function dynamically modifies to set of server names without halting or restarting the server.

11. The data processing system of claim 7 wherein the request for the function is received from a network.

12. The data processing system of claim 7 wherein the set of server names comprises a plurality of server names.

13. A computer program product on a recordable-type media for use in a data processing system for configuring a server in a distributed data processing system, the computer program product comprising:

first instructions for receiving a first server name and a second sewer name, wherein the server is configured to respond to requests directed to a set of server names comprising the first server name; and second instructions for dynamically modifying a membership of the second server name in the set of server names.

14. The computer program product of claim 13 wherein the set of server names is dynamically modified without halting or restarting the server.

\* \* \* \* \*